United States Patent [19]

Maravich

[11] 4,117,723
[45] Oct. 3, 1978

[54] ELECTRONIC THERMOMETER

[76] Inventor: Rudolph Maravich, 1842 Galaxy Dr., Newport Beach, Calif. 92660

[21] Appl. No.: 735,592

[22] Filed: Oct. 26, 1976

[51] Int. Cl.² .............................................. G01K 7/24
[52] U.S. Cl. ............................................... 73/362 AR
[58] Field of Search ................. 73/362 AR; 307/310; 328/3

[56] References Cited

U.S. PATENT DOCUMENTS

| | | | |
|---|---|---|---|
| 3,494,196 | 2/1970 | Moussette | 73/362 AR |
| 3,776,040 | 12/1973 | Gould | 73/362 AR |
| 3,787,735 | 1/1974 | DeWitte et al. | 307/215 X |
| 3,857,285 | 12/1974 | Athey et al. | 73/362 AR |
| 3,882,481 | 5/1975 | Turner | 73/362 AR X |
| 4,023,094 | 5/1977 | Adams | 73/362 AR X |

Primary Examiner—Jerry W. Myracle
Attorney, Agent, or Firm—Newton H. Lee, Jr.

[57] ABSTRACT

An electronic thermometer has a bridge circuit and light emitting diode which is turned on instantaneously when the temperature being sensed causes activation of the light emitting diode, and a dial indicates the sensed temperature. The light emitting diode is rendered inoperative if the source voltage is low.

7 Claims, 2 Drawing Figures

ELECTRONIC THERMOMETER

BACKGROUND OF THE INVENTION

Heretofore, various electronic thermometers have been provided which have employed heat sensing resistive elements in a circuit including a meter which can be adjusted to indicate temperature as determined by the heat applied to the resistive element, such as a resistor or thermistor in a probe adapted to be inserted into a body cavity of humans or animals.

Such previous electronic thermometers have been proven to be economically and technically superior to the customary mercury or glass thermometers for clinical use. However, there has continued to be a need for an electronic thermometer of the variable resistance type which is inexpensive and easy to use in the home, as well as in hospitals or like facilities.

One of the major cost factors in electrical thermometers has always been the use of a meter, either to indicate temperature or to indicate a balanced resistance or null in the usual bridge circuit.

A problem in battery operated thermometers has been that erroneous temperature readings could result from battery drain or age which results in low voltage output.

THE PRIOR ART

The prior art is exemplified by:
U.S. Pat. No. 3,485,102
U.S. Pat. No. 3,469,449

In these prior art devices, it is notable that a meter, either a temperature indicating or a null meter is employed. Such meters are expensive and in the total unit represent a substantial portion of the cost. Moreover, low battery or source voltage can result in erroneous reading.

SUMMARY OF THE INVENTION

The present invention provides an electrical thermometer which is relatively inexpensive, and therefore, ideally suited for home use, as well as for use in institutions of the type where temperatures are frequently taken by inexperienced help, due to the accuracy and ease of use of the thermometer.

More particularly, the electrical thermometer of the invention provides a compact electrical unit having a means which responds to the temperature sensing means for instantaneously indicating that the temperature to be sensed is at a level which activates the indicating means.

In accomplishing the foregoing, a temperature responsive resistor is placed in a bridge circuit to turn on a snap action switching means which causes energization of indicating means, either visual or audible, say, illumination of a visible light, such as a light emitting diode. By means of an adjustable potentiometer, the voltage through the bridge circuit is adjusted to energize the indicating means or turn on the light through a NOR gate circuit including a pair of NPN transistors, whereby the indicating means or light emitting diode "snaps" on instantaneously when the voltage across the bridge circuit is adjusted by a simple potentiometer to indicate temperature. However, means are provided to render the indicating means inoperative if the source or battery voltage drops below a selected level, so that erroneous readings are not possible due to battery drain or degeneration from age, or the like.

In a more specific sense, the temperature indicating circuit includes a bridge circuit having a variable potentiometer, in one side, adjustable by a dial to compensate for voltage change caused by a temperature sensing resistor, so that when the dial indicates the temperature determined by the sensing resistor, the light emitting diode is instantaneously turned on and the dial indicates the temperature being sensed. Such a system does not require expensive volt meters for accuracy and is therefore relatively inexpensive. In addition, the system does not require a significant degree of skill for effective use, and erroneous temperature readings due to low source voltage are not possible.

This invention possesses many other advantages, and has other purposes which may be made more clearly apparent from a consideration of the forms in which it may be embodied. These forms are shown in the drawings accompanying and forming part of the present specification. They will now be described in detail, for the purpose of illustrating the general principals of the invention; but it is to be understood that such detailed descriptions are not to be taken in a limiting sense.

BRIEF DESCRIPTIONS OF THE DRAWINGS

FIG. 1 is a plan view illustrating a thermometer case and probe incorporating the invention; and FIG. 2 is one schematic diagram of a bridge circuit and indicator according to the invention.

DESCRIPTION OF THE PREFERRED EMBODIMENT

Figure 1:
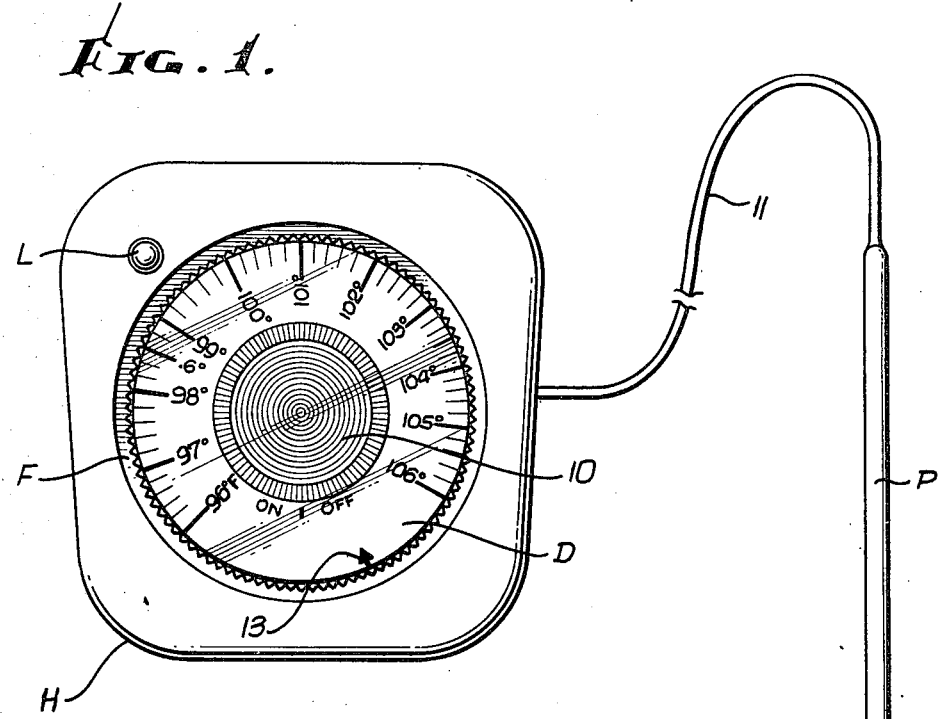

As seen in FIG. 1, an electrical thermometer unit is shown in an illustrative form comprising a housing H having a temperature indicating dial face F fixed on the housing, and a rotary dial D having a turing knob 10. Extending from the housing H is an electrical cord 11 at the free end of which is a probe P adapted for insertion into a patient to detect temperature. At the end of the probe P is a thermistor chip 12 forming part of the electrical circuitry of FIG. 2, later to be described.

Figure 2:
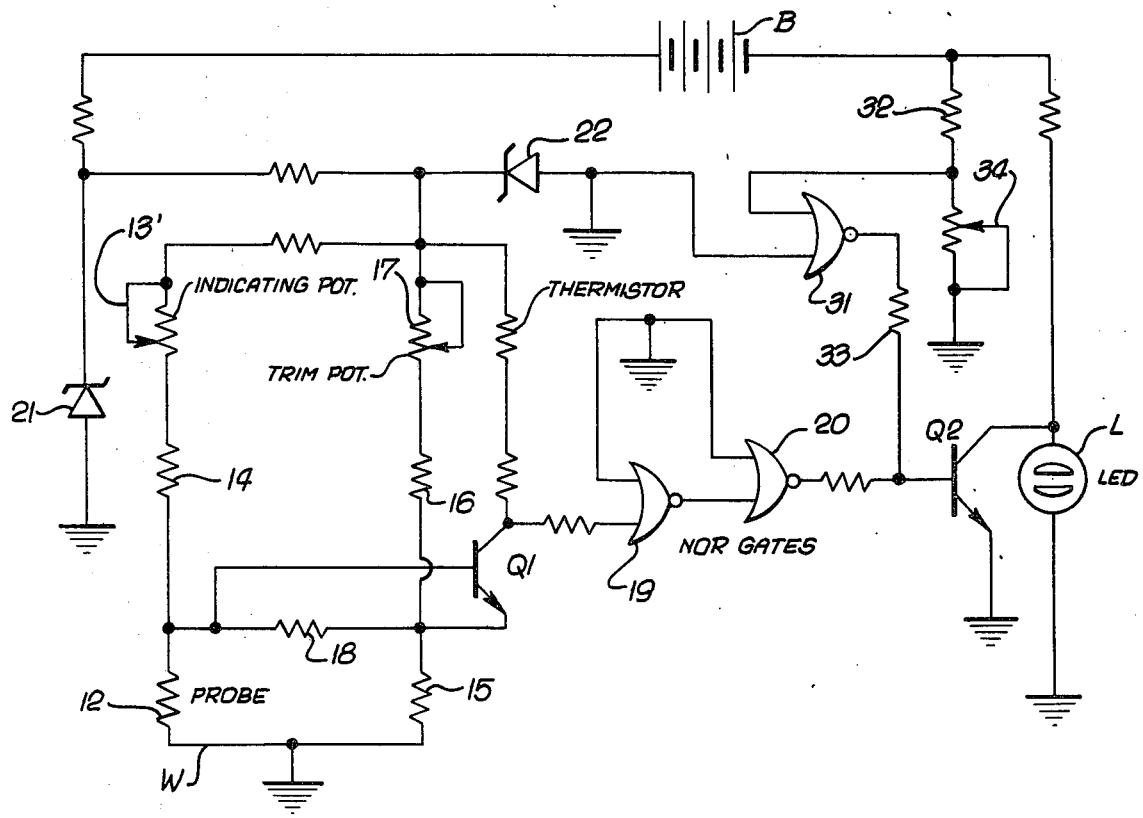

The dial face F is graduated in degrees F between 95.5° and 106°, and the rotary dial D has a marker or pointer 13 which will indicate the temperature being measured when rotation of the dial D adjusts the circuitry of FIG. 2 to turn on a light L suitably located on the housing.

In use, when the thermometer is idle the dial D is turned counter-clockwise until the pointer 13 is in the "OFF" position. The probe is inserted into a patient, and after a suitable period of time the dial D is rotated to the right until the light L snaps on, at which time the pointer 13 on the dial will indicate the patient's temperature with reference to the dial face F. The dial is extremely easy to read and continues to indicate the temperature until the dial is reversed to the "OFF" position.

Referring to FIG. 2, there is shown a basic schematic for the electronic circuit components of the thermometer.

The semiconductor chip or thermistor 12 of the probe is shown in a leg of a Wheatstone Bridge W. The resistance of the thermistor varies according to the temperature sensed by the probe. A linear potentiometer or "INDICATING" potentiometer 13' and a fixed resistor 14 are placed in the circuit on the same side of the bridge with the thermistor 12 to adjust the voltage across the bridge responsive to rotation of the knob 10 of the dial D. On the other side of the bridge is a fixed resistor 15 opposite the thermistor 12, and another fixed resistor 16 and a "TRIM" potentiometer 17 are in the bridge opposite the resistor 14 and the "INDICATING" potentiometer 13'. The variable potentiometer 17 provides means to set the thermometer at a known temperature and eliminating variables.

Between the sides of the bridge is a sensing resistor 18 which constitutes a base to emitter resistor of NPN transistor Q1, whereby when voltage change is caused by the temperature applied to probe resistor 12 and the voltage across the sensing resistor 18 is varied by adjusting the indicating potentiometer 13, the transistor Q1 is turned on. The voltage drop at the collector of transistor Q1 is conducted to the first of two "NOR" gates 19 and 20 as an "O" and the output from this first "NOR" gate 19 is transmitted to the second "NOR" gate 20 as a "1". The output from the "NOR" gate 20 is "O" which is connected to the base of a second NPN transistor Q2, turning off this transistor and allowing current flow to the light source L from a typical battery B. The battery B is connected with the bridge circuit as shown, and to the light source L. The battery is also protected against drain by suitable Zener diodes 21 and 22.

In the circuit shown, the light source L is a light emitting diode "LED" requiring small voltage, though other light sources may be employed.

It is significant to the invention that the means for indicating temperature is not a high cost meter, but a low cost light source. It is further significant to the invention that the combination of the transistors Q1 and Q2, and the "NOR" gates 19 and 20 provide "snap acting" means whereby the light source is instataneously energized.

Consequently, a simple, inexpensive electronic thermometer is provided which is not only well suited for clinical use, due to accuracy, but is also within the price range attractive for family use.

In order to render the electronic thermometer relatively fool-proof it is preferred that means be provided to prevent erroneous readings of the type which can result from low battery voltage. It has been determined that with the circuitry as specifically described above, a typical 9V. battery is effective to produce accurate readings until the voltage output deteriorates to about 6.70v. At that point the readings may be erroneous, so that it becomes important to the user, particularly the unskilled, that the thermometer be inoperative to give any reading. Means are provided, in accordance with the invention, to render the light emitting diode inoperative if the battery or source voltage drops below a level at some arbitrary level above that at which the thermometer may become inaccurate, say 7.0v. in the case of the present circuitry. This is accomplished by supplying sufficient voltage to the base of transistor Q2 to turn it on and thus preclude illumination of the light emitting diode L. Such a thermometer thus becomes more safe for use by unskilled persons. It will be understood that the means described below for rendering the thermometer inoperative is also means for indicating that the battery should be replaced.

In the illustrated circuit the safety function is performed by connecting the battery in circuit with a "NOR" gate 31, a pair of resistors 32, 33 and a variable potentiometer 34, the output from the "NOR" gate 31 being connected to the base of the diode control transistor Q2.

More specifically, the gate 31 is connected to the battery ground and between the resistor 32 and potentiometer 34 to sample the battery voltage in the resistor divider network connected across the battery. The potentiometer 34 can be adjusted or selected to cause the system to function as described below when the battery voltage drops to, say, 7v.

When voltage between the resistors 32 and 34 reaches the low level, the "NOR" gate 31 is adopted to change from a logic 0 state to a logic I output, thereby turning the transitor Q2 on and causing the diode L to remain "OFF" for any battery voltage under that determined by the potentiometer 34. Of course, in lieu of the potentiometer 34 a resistor of selected value may be employed so that the light emitting diode L cannot be energized when voltage drops below a given level.

Also, if desired a drop in voltage may cause illumination of a light source to indicate visually that the thermometer should not or cannot be employed.

I claim:

1. An electronic thermometer comprising: a bridge circuit a temperature variable resistor and a manually variable resistor, dial means for adjusting the manually variable resistor and indicating temperature, and light emitting diode means for indicating that the temperature sensed by the temperature variable resistor is indicated by said dial means including means for instantaneously energizing said diode means when said dial indicates the temperature sensed by said temperature variable resistor.

2. In an electronic thermometer as defined in claim 1, said means for instantaneously energizing said diode means comprises a pair of transistors connected between said bridge circuit and said diode means and gate means between said transistors.

3. In an electronic thermometer as defined in claim 1, said means for instantaneously energizing said diode means comprises a pair of transistors connected between said bridge circuit and said diode means and gate means between said transistors comprising a pair of NOR gates.

4. In an electronic thermometer as defined in claim 1, a battery for energizing said diode means, and means responsive to the voltage of said battery for rendering said diode means inoperative when the battery voltage is below a given value.

5. In a electronic thermometer as defined in claim 1, means including a transistor and a battery in circuit with said transistor and said diode means, and also including gate means connected across said battery and with said transistor to prevent energization of said diode means when the battery voltage is below a given level.

6. An electronic thermometer comprising: a housing having a dial face marked in degrees of temperature, a dial having a marker shiftable relative to said dial face, and indicating means including a light emitting diode in said housing, a probe having a temperature responsive resistor element therein for insertion into a patient, and a circuit means within said housing for instantaneously energizing said indicating means when the dial marker is moved to a position representing the temperature sensed by said resistor.

7. An electronic thermometer as defined in claim 6, including a battery in said housing in circuit with said diode means, and means responsive to the voltage of said battery for rendering said diode means inoperative when the battery voltage is below a given value.

* * * * *